United States Patent [19]
Harkins

[11] Patent Number: 6,151,395
[45] Date of Patent: Nov. 21, 2000

[54] SYSTEM AND METHOD FOR REGENERATING SECRET KEYS IN DIFFIE-HELLMAN COMMUNICATION SESSIONS

[75] Inventor: Dan Harkins, San Jose, Calif.

[73] Assignee: Cisco Technology, Inc., San Jose, Calif.

[21] Appl. No.: 08/984,863

[22] Filed: Dec. 4, 1997

[51] Int. Cl.$^7$ .................................. H04L 9/12; H04L 9/30
[52] U.S. Cl. .................................. 380/286; 380/28; 380/30
[58] Field of Search .................................. 380/28, 21, 30, 380/286

[56] References Cited

U.S. PATENT DOCUMENTS

| | | | |
|---|---|---|---|
| 4,776,011 | 10/1988 | Busby | 380/37 |
| 5,588,060 | 12/1996 | Aziz | 380/30 |
| 5,633,933 | 5/1997 | Aziz | 380/30 |
| 5,850,451 | 12/1998 | Sudia | 380/49 |
| 5,889,865 | 3/1999 | Vanstone et al. | 380/25 |
| 5,920,630 | 7/1999 | Wertheimer et al. | 380/25 |

OTHER PUBLICATIONS

Diffie et al., "New Directions in Cryptography," IEEE Transactions on Information Theory; vol. IT–22, No. 6, Nov. 1976, pp. 644–654.

Diffie, "The First Ten Years of Public–Key Cryptography", *Proceedings of the IEEE*, vol. 76, No. 5, May 1988, pp. 560–563.

Silvio Micali, "Guaranteed Partial Key Escrow," MIT/LCS/TM–537, Laboratory for Computer Science, Massachusetts Institutes of Technology, Cambridge, MA (1995).

Mihir Bellare and Shafi Goldwasser, "Verifiable Partial Key Escrow," University of California, San Diego, CSE Department Technical Report.

"Escrowed Encryption Standard (ESS)," National Institute for Standards and Technology, Federal Information Processing Standards Publication (FIPS PUB) 185, Feb. 9, 1994.

Jim Omura, "Alternatives to RSA: Using Diffie–Hellman with DSS," White Paper, Cylink, Sep. 1995.

*Primary Examiner*—Tod R. Swann
*Assistant Examiner*—Justin T. Durrow
*Attorney, Agent, or Firm*—Carr & Ferrell LLP

[57] ABSTRACT

The present invention is directed to a system and method for regenerating secret keys by escrowing only one private value in a Diffie-Hellman exchange where a public number is exchanged between the two participants according to the equation:

$$Y = g^x \bmod p,$$

where Y is the Diffie-Hellman public number, X is the Diffie-Hellman private number, g is the generator, and p is the prime. The public value for each communication session is controlled after the escrow of the private value, and the secret keys are regenerated from the escrowed private value and the controlled public values. The escrowed private value is transmitted to the escrow center with full proof of security and authenticity and, if desired, this private value can be changed and re-sent to the escrow center.

31 Claims, 12 Drawing Sheets

Prior Art

SYSTEM AND METHOD FOR REGENERATING SECRET KEYS IN DIFFIE-HELLMAN COMMUNICATION SESSIONS

BACKGROUND OF THE INVENTION

1. Field of the Invention

This invention relates generally to cryptography and more particularly to a system and method for regenerating secret keys involved in Diffie-Hellman exchanges. Upon regeneration of secret keys, messages in secret communications are decrypted and observed.

2. Description of the Background Art

Cryptography involves the enciphering and deciphering of messages in a secret code, and has utility in the field of secure communications where issues of privacy and authentication of messages in public communications are important concerns. A privacy system prevents the extraction by unauthorized parties ("eavesdroppers") of information from messages transmitted over a communication channel, thus assuring that only the intended recipient is able to read the message. An authentication system prevents unauthorized intermeddling with the message from unintended parties ("intermeddlers"), assuring the party at the receiving side that the message is that intended by its sender. The authentication system also assures the recipient that the sender is the party the message was actually sent from. Depending upon safeguards, any communication channel may be threatened with eavesdropping and intermeddling, which thereby threatens the integrity of the messages or the identities of the transmitters.

Figure 1:
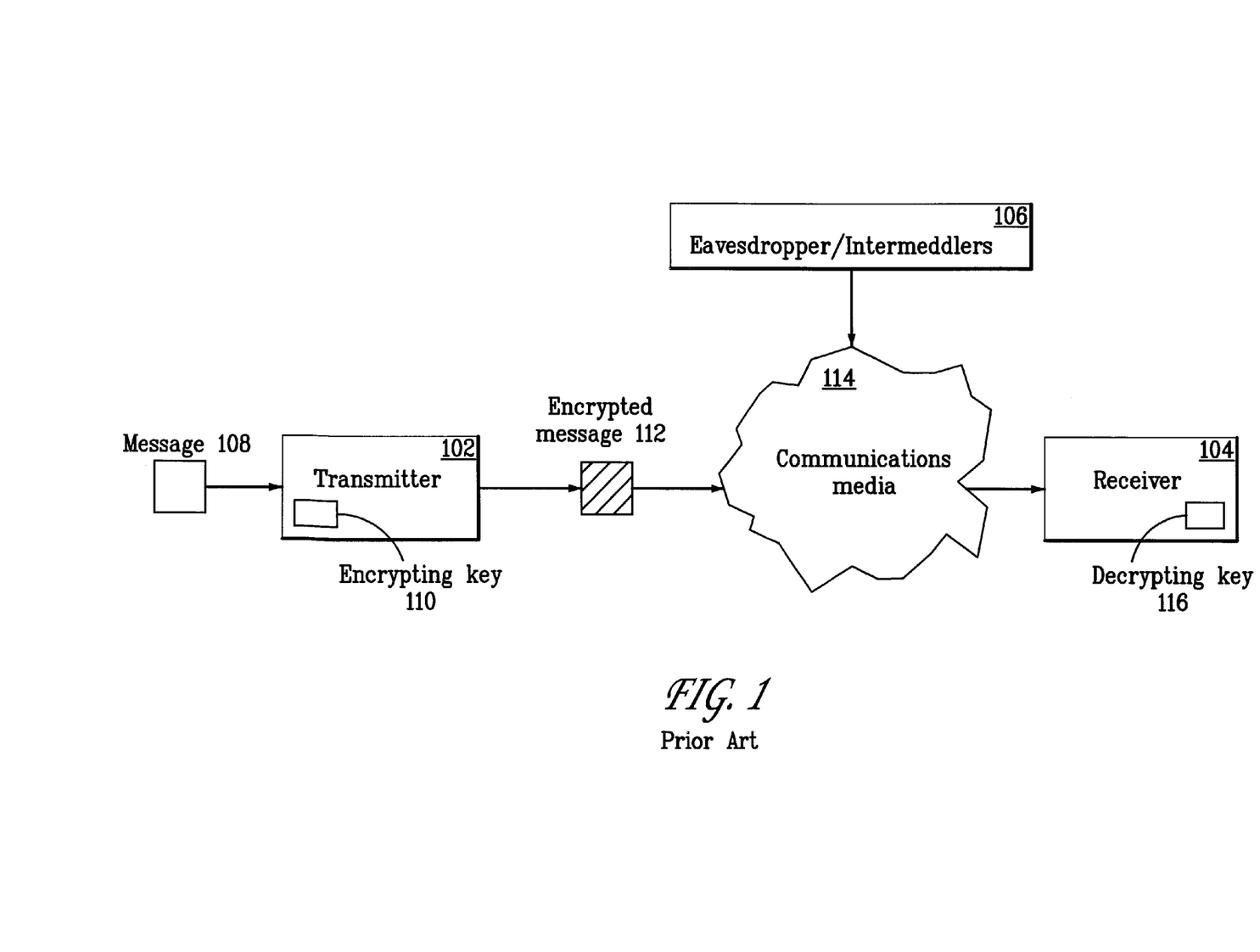
FIG. 1 is a block diagram showing a flow of information in a conventional cryptographic system.

FIG. 1 illustrates the flow of information in a conventional cryptographic communication. There are three parties: a transmitter 102, a receiver 104, and an eavesdropper or intermeddler 106. The transmitter 102 generates a message 108 to be communicated over a communication channel to the receiver 104. In order to prevent the eavesdroppers and intermeddlers 106 from reading the messages, transmitter 102 encrypts the messages 108 using a cryptography key 110 producing encrypted messages 112, which are sent to the receiver 104 over communications media 114. The legitimate receiver 104 must know how to decrypt the encrypted messages 112 using decrypting key 116 to have access to the original message 108. The roles of transmitter 102 and receiver 104 are reversible, that is, a receiver 104 becomes a transmitter 102, which transmits encrypted messages 112 to the former transmitter 102, which in turn becomes receiver 104.

Encrypted messages in communication systems solve message security problems when message encryption techniques are properly used in the hands of legitimate personnel. However, in the hands of criminals or terrorists, encrypted communications are an aid to illegal activities because the messages in the communications are secret to the public. The United States Government, in light of the needs to prevent illegitimate activities, has required that it have access to encrypted communications so that it can observe the original, unencrypted messages 108. The government therefore has proposed various plans which require the parties involved in encrypted communications to hold, or "escrow," the encryption keys 110 used to encrypt messages 108 for some period of time. These encryption keys 110 must be readily surrendered to the government upon request. Having acquired the encryption keys 110, the government then has access to the original messages 108 through decryption of the messages 112 which are exchanged between suspect parties.

The requirement to hold encryption keys for a long period of time has great impact on embedded communications devices, especially routers, as most routers do not have any hard disk or other memory devices to store encryption keys. Additionally, it is desirable to implement a cryptographic scheme utilizing ephemeral keys which are derived from a Diffie-Hellman exchange, with one key per communication session. These ephemeral keys are then destroyed after each session. Federal law mandates access to keys for a period of up to seven years, requiring storage of hundreds of thousands of keys since hundreds of thousands of communication sessions may occur in a period of seven years with each session generating a unique key. Moreover, it is desirable to embrace a standard where any key escrow scheme does not preclude interoperability with existing standards. For example, if one party implements a key escrow scheme and others do not implement that key escrow scheme, it is desirable that the party with the escrow scheme is not precluded from inter-operating with the others. It is further desirable that a key escrow scheme can be seamlessly added to any standard-complaint key management protocol which utilizes a Diffie-Hellman exchange in order to additionally generate ephemeral secret keys such that the additional implementation which performs escrow remains fully standard-compliant. The escrow requirement thus raises the concern that the escrow of keys must be done securely, i.e., with full proof of security and authentication.

Attempts at escrowing ephemeral keys have been discussed by Silvio Micali, "Guaranteed Partial Key-Escrow," MIT/LCS/TM-537, Laboratory for Computer Science, Massachusetts Institutes of Technology, Cambridge, Cambridge, Mass. (1995); and by Mihir Bellare and Shafi Goldwasser, "Verifiable Partial Key Escrow," University of California, San Diego, CSE Department Technical Report. Both of these papers describe key escrow schemes that take advantage of a Diffie-Hellman exchange and allow for recovery of communications using a partially escrowed key. Each key used for bulk encryption by a router, for example, is partially escrowed. However, each of these schemes concerns only the partial escrow of a single ephemeral key, and does not deal with the problem of ephemeral session keys, where hundreds or thousands of keys are generated during a period of time of up to seven years.

A key escrow scheme applicable to network communications devices is discussed in "Escrowed Encryption Standard (ESS)," National Institute for Standards and Technology, Federal Information Processing Standards Publication (FIPS PUB) 185, 1994. However, this approach involves a hardware solution, and requires both parties in a communication to be active participants in the escrow operation.

Another key escrow scheme, also applicable to network communications devices, is disclosed by Jim Omura, "Alternatives to RSA Using Diffie-Hellman with DSS," White Paper, Cylink, September 1995. In this scheme, the escrowing party sends the key to an escrow agent, and the agent in return provides the escrowee a public number to use in the next Diffie-exchange. However, this scheme involves the escrow of a single key and requires interaction with the escrow agent for each key.

In light of the above shortcomings of prior art techniques in encryption key escrowing, there is a need for an implementation that allows a complete recovery of all encryption keys involved in Diffie-Hellman exchanges and yet still prevents eavesdroppers and intermeddlers from capturing the secrets of private communications. In accordance with the present invention, there are no special headers or messages required between parties for secure communications.

Neither is there a special hardware requirement for any party involved in the communications.

Therefore, it is an object of this invention to provide a key-escrowing scheme that requires only a single interaction with the escrow agent during a time period of variable length and eliminates the needs to escrow each and every key, and where there is no necessity to store all of the session keys while preserving the ephemeral nature of these keys.

It is a further object of this invention to remove the requirement that a participating networking communication device maintain session keys after the life of the session has passed, and thereby to retain the ephemeral nature of the keys.

It is still a further object of the invention to allow a party to take part in an escrow and to continue inter-operating with existing standards and methods of secured communications.

It is a further object of the invention to allow a solution that is applicable to all devices on a network, including hosts, servers and routers.

It is still a further object of the invention to allow third party law enforcement officers to recover communication information and to monitor messages exchanged between the parties taking part in the Diffie-Hellman communications.

It is still a further object of the invention to allow recovery of the communication even if only one party was involved in the escrowing scheme.

It is still a further object of the invention to maintain the security strength of the Diffie-Hellman exchange.

It is still a further object of the invention to escrow the key to the escrowing center with confidentiality and proof of ownership, thereby assuring both privacy and authenticity of the escrowed information.

SUMMARY OF THE INVENTION

The present invention involves a method of regenerating ephemeral secret keys for Diffie-Hellman communication sessions. This key regeneration enables a third party "L" (such as a law enforcement officer) to gain access to communications previously exchanged between a party "A" and any other parties e.g. "B" or "C." Party A initially makes a private value Xa available to the third party L and, in one embodiment, party A escrows Xa to the escrow center, where the private value Xa is kept secret and made available only to third party L. Party A may then engage in any number of Diffie-Hellman exchanges with any remote parties in a plurality of communication sessions for a time period t.

For the first communication session between party A and another party B after the escrowing of private value Xa to the escrow center and prior to the conclusion of the period t, party A generates public value Ya from the equation:

$$Ya=g^{(Xa+n)} \bmod p,$$

where n preferably equals to 0, while party B generates public value Yb from the equation:

$$YB=g^{Xb} \bmod p.$$

The parties A and B provide their respective public values Ya and Yb to the other party, i.e., Ya to party B and Yb to party A. Both parties A and B then generate, respectively, a secret key Kab and Kba for their secret communication session, where:

$$Kab=Yb^{Xa} \bmod p = Kba=Ya^{Xb} \bmod p = K,$$

a common key for both parties. For each of the successive communication sessions, whether to party B or to any other party C, for example, party A generates public value Ya from the same equation $$Ya=g^{(Xa+n)} \bmod p,$$

where n is a new value that is preferably increased by 1 from a previous value of n, while party C generates public value Yc from the equation $$Yc=g^{Xc} \bmod p,$$

where Xc is a random value of sufficient entropy to guarantee the strength of the secret value K.

When the third party L desires to gain access to communications between the party A and any other party B or C, third party L needs to regenerate the secret key Kab involved in the communication between party A and party B. Party L then obtains Xa from the escrow center and public values Ya and Yb associated with the communication session that party L desires to gain access to. For example, party L eavesdrops directly on the exchange which was done without encryption. In one preferred method, party L calculates secret key Kab using the equation $$Kab=Yb^{(Xa+n)} \bmod p.$$

Preferably party L sets n equal to 0, calculates Kab and tries to access the desired communication session; if unsuccessful, party L then changes n, preferably incrementing n by one from previous value of n, and recalculates Kab until party L is successful in acquiring Kab.

In another preferred method, party L calculates secret key Kab using the same equation $$Kab=Yb^{(Xa+n)} \bmod p,$$

but by first obtaining n from the equation $$Y=g^{(Xa+n)} \bmod p.$$

Preferably, party L sets n equal 0, calculates Y, then compares Y to Ya. If Y does not equal to Ya, party L changes n, preferably incrementing n by one from a previous value of n, and recalculates Y until Y equals Ya. When Y equals Ya, party L has acquired the value for n, and then calculates Kab=Yb$^{(Xa+n)}$ mod p with the acquired n and the previously known values of Yb and Xa.

After time period t has elapsed, a new value Xa is derived and escrowed with the escrow agent. Time period t can be based on the time between escrows or a value v such that a re-escrow is performed when n=v.

DETAILED DESCRIPTION OF THE PREFERRED EMBODIMENT

This invention is directed to a method for regenerating encryption keys involved in Diffie-Hellman exchanges in computer network communications. The Diffie-Hellman exchange is also known as the exponential key exchange since it uses modular exponentiation, where a number, the generator, is taken to a certain exponent, the private number, modulus a large prime number, the prime, to create another large value, the public number. The public number is exchanged between the two participants according to the equation:

$$Y = g^X \bmod p,$$

where Y is the Diffie-Hellman public number, X is the Diffie-Hellman private number, g is the generator, and p is the prime.

Figure 2A:
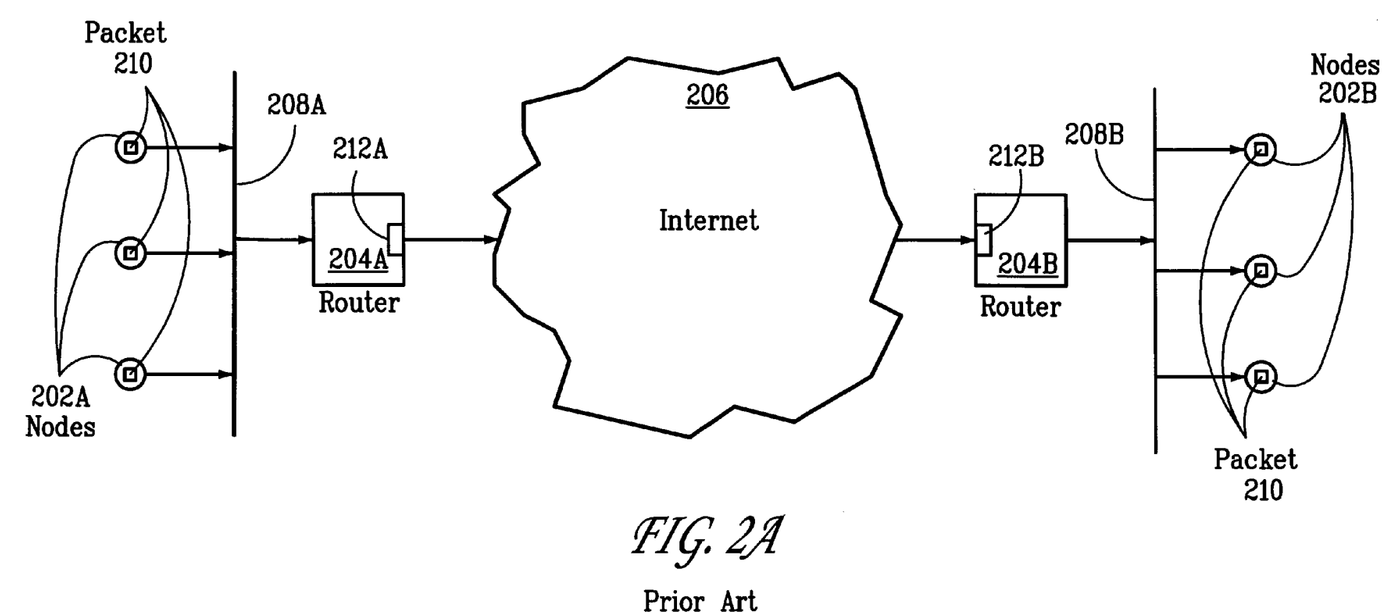
FIG. 2A illustrates an exemplary a computer network communication system using routers.

Referring now to FIG. 2A, there is shown an example of a computer network communication system using routers. Hosts 202A are connected via a network 208A to router 204A and similarly hosts 202B are connected via a network 208B to router 204B. Party A transmits and receives messages through router 204A and host 202A, while party B transmits and receives messages through router 204B and host 202B. Routers 204 are network communication devices which connect networks and route packets 210. Each router 204 may have multiple interfaces 212. When a packet 210 arrives at one interface 212, the router 204 inspects the packet 210 to determine where this packet 210 is destined to go, and then determines which of its other interfaces 212 is the appropriate one to send this packet 210. In this manner, a packet 210 goes from router to router along a path from source to destination. A host 202 is generally, but not necessarily, a computer on a network, and is a communications endpoint.

Figure 2B:
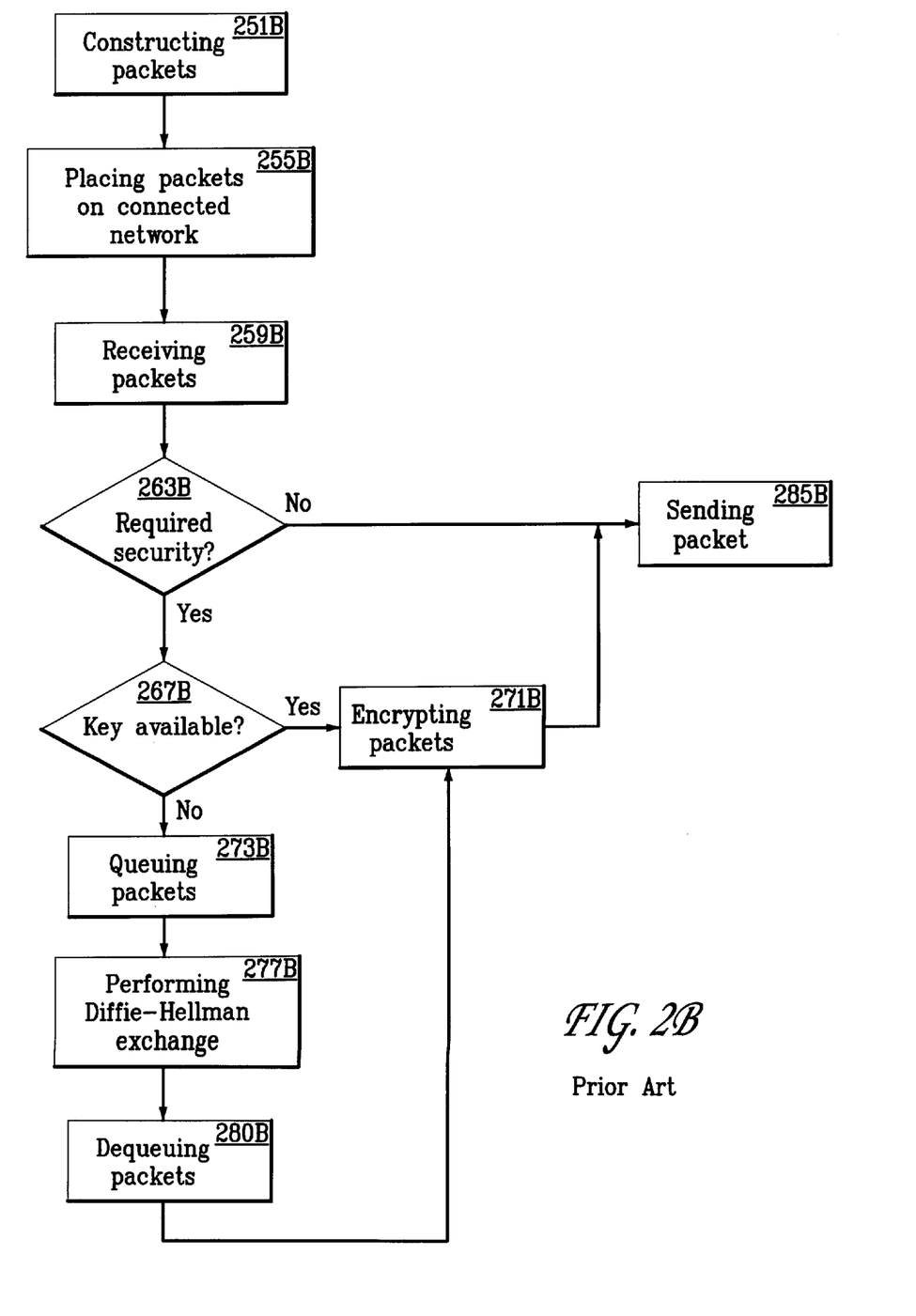
FIG. 2B illustrates how a packet is sent from one source to destination through an intermediate communication device which provides security.

Referring now to FIG. 2B for an illustration of how a packet 210 is sent from a source to a destination. At step 251B, host 202A constructs messages in the form of packets 210 and at step 255B places these packets 210 on its interface 212A. At step 259B, router 204A receives packets 210. At step 263B, router 204A determines whether the communication requires security; if it does, router 204A, at step 267B, determines if an encryption key exists in router 204A's memory. If an encryption keys exists, router 204A encrypts the packet 210 at step 271B. This encryption can be performed either in hardware or software. If, at step 267B, router 204A found no key in memory, router 204A then queues the packet 210 at step 273B, and at step 277B, router 204A initiates a Diffie-Hellman exchange. Upon completion of the Diffie-Hellman exchange and establishment of a shared secret router 204A, at step 280B, de-queues all queued packets 210 and encrypts them at step 271B. At step 285B, router 204A sends the packet 210 (whether encrypted or not) to an appropriate destination, which could be another router 204B or a host 202B, for example.

The Diffie-Hellman exchange in computer network communications takes advantage of the ease with which exponentials can be computed in a Galois finite field GF(p), with a prime number p of elements under arithmetic modulo p, as compared with the difficulty of computing logarithms in the same field. Number p of elements includes 0, 1, 2, . . . p−1 elements. If $$Y = g^X \bmod p, \text{ for } 1 < X < p-1$$

where g is a fixed primitive element of GF(p) and the powers of g produce all the nonzero elements 1, 2, . . . , p−1 of GF(p), then X is referred to as the logarithm of Y to the base g, over GF(p):

$$X = \log_g Y \text{ over } GF(p), \text{ for } 1 < Y < p-1$$

Calculation of Y from X is straightforward. Using repeated squaring, it takes at most $2^{\log(\text{base } 2)} p$ multiplications. For example, $$g^{37} = g^{(32+4+1)} = ((((g^{}2)^{}21)^{}2)^{}2 \times (g^{}2)^{}2 \times g$$

Computing X from Y, on the other hand, is typically far more difficult. If p has been chosen correctly, extracting logarithms modulo p requires on the order of $p^{1/2}$ operations. The security of the Diffie-Hellman encryption technique depends on the difficulty of computing logarithms mod p, and the system can be broken if an algorithm whose complexity grows as $\log_2 p$ were to be found. X and Y in the Diffie-Hellman technique are referred to as the "private value" and "public value," respectively (Diffie, et al., "New Directions in Cryptography," *IEEE Transactions on Information Theory;* vol. IT-22, No. 6, Nov. 1976, page 649; and Diffie, "The First Ten Years of Public-Key Cryptography," *Proceedings of the IEEE,* vol. 76, No. 5, May 1988, page 562–563).

Figure 3A:
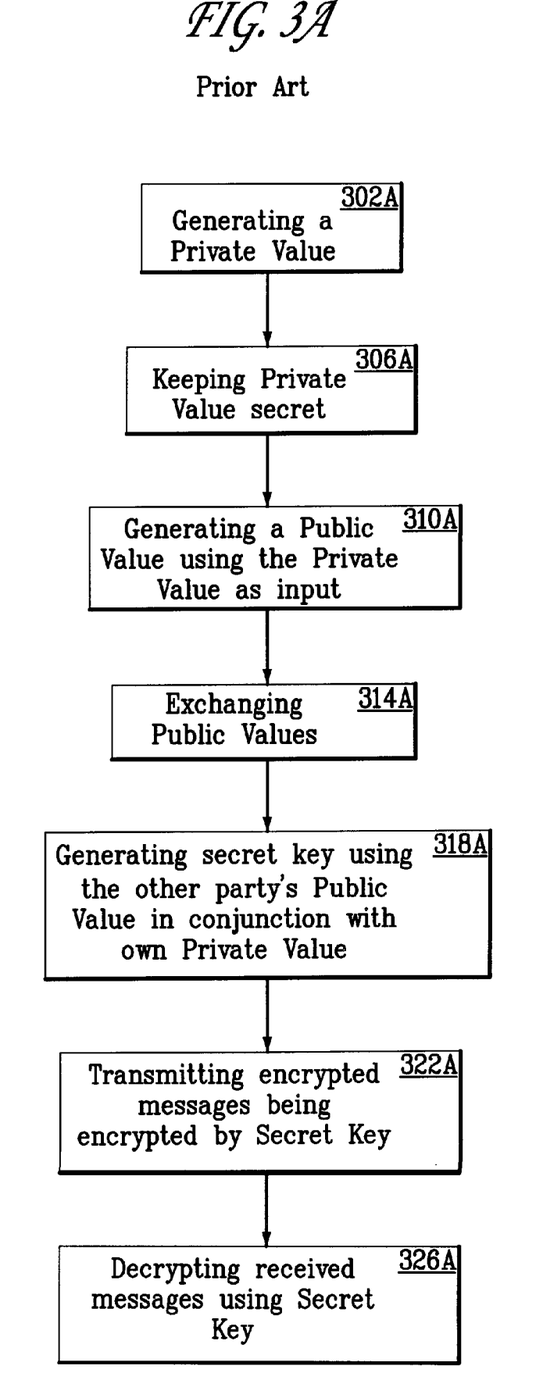
FIG. 3A shows the steps involved in a Diffie-Hellman exchange between two parties. It also shows use of the secret with a symmetric cipher.

FIG. 3A shows the steps involved in an Diffie-Hellman exchange between two parties. At step 302A, each of the two parties generates its own private value X, and keeps this private value X secret to itself, in step 306A. At step 310A, each party generates a public value Y, using its own private value X as an input. Each party then provides its own public value Y to the other party in step 314A. In a preferred embodiment of the invention, each party at step 318A exchanges its public value Y. Upon receiving the public value Y from the other party, each party generates a secret value K using the other party's public value Y in conjunction with its own private value X. Even though each of the two parties independently generates two secret values K, the two values K are the same, i.e., they possess the same values, according to the Diffie-Hellman exchange characteristic, to be explained further in detail in accordance with FIG. 3B and 3C. At step 322A, each party uses the secret value K to encrypt and transmit messages, and to communicate the encrypted messages to the other party. Similarly, at step 326A, each party uses the secret value K to decrypt the encrypted messages received from the other party.

Figure 3B:
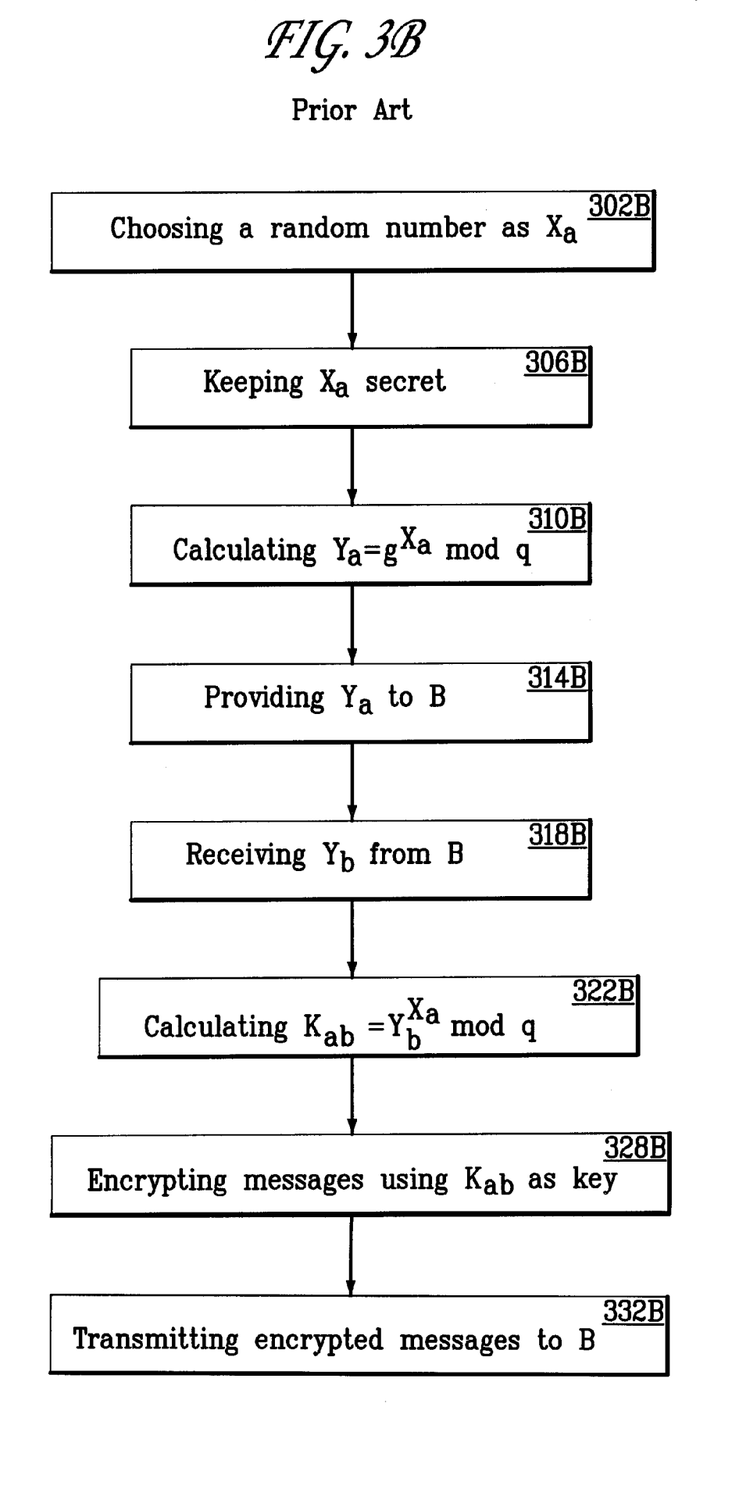
FIG. 3B illustrates in detail the steps where a party A transmits its messages to a party B.
Figure 3C:
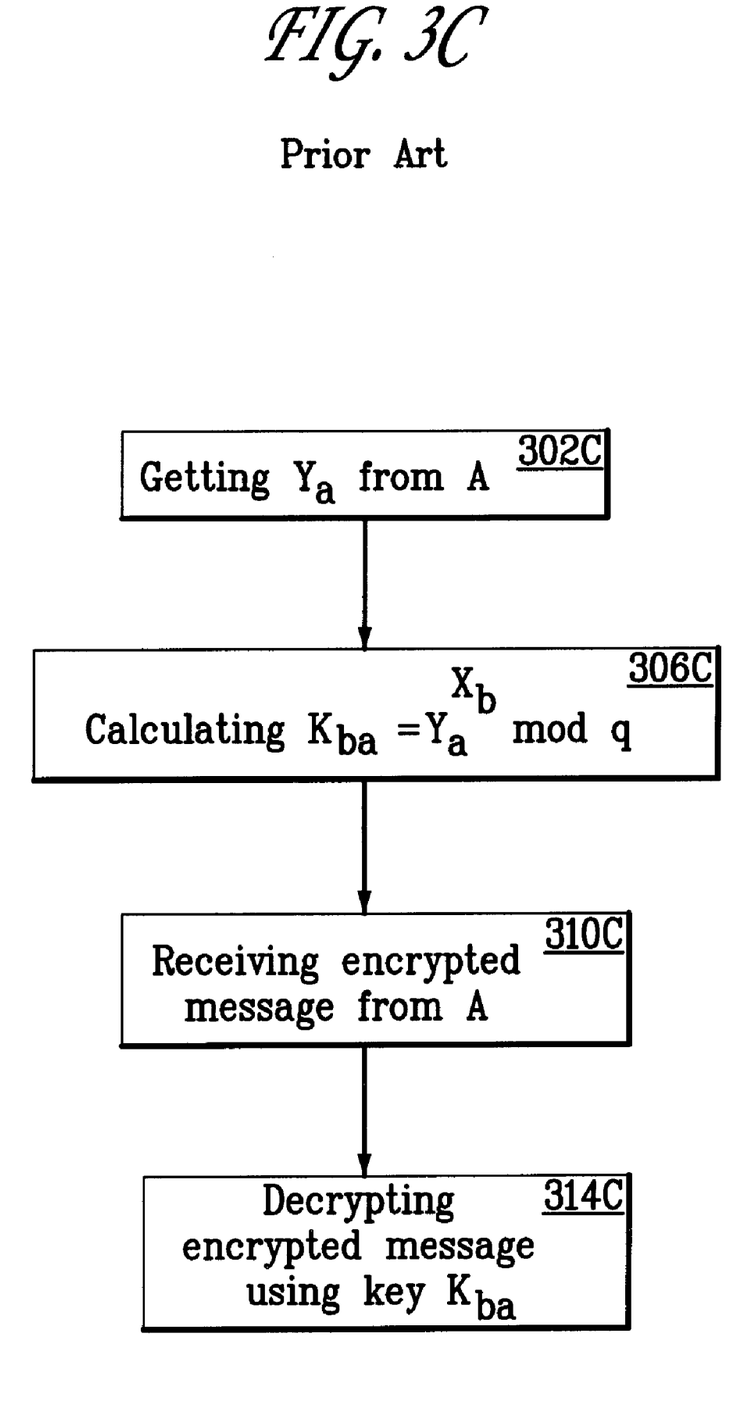
FIG. 3C illustrates in detail the steps where a party B receives the messages transmitted from a party A.

Using as an example two parties A and B exchanging information using the Diffie-Hellman encryption technique, FIG. 3B shows the steps a party A uses to send its messages to a party B, while FIG. 3C shows the steps the party B uses to receive its messages from the party A. Referring first to step 302B in FIG. 3B, party A generates its private value Xa, which is preferably an independent random number, choosing uniformly from the set of integers 1, 2, ..., p−1, where p was explained above. In step 306B, party A keeps Xa secret. In step 310B, party A then generates its public value Ya, where $$Ya = g^{Xa} \bmod p$$

For example, if g=2, and p=$2^{1024}-2^{960}-1+2^{264}*\{[2^{894}]+129093\}$, or in hexadecimal =FFFFFFFF FFFFFFFF C90FDAA2 2168C234
C4C6628B 80DC1CD1 29024E08 8A67CC74
020BBEA6 3B139B22 514A0879 8E3404DD
EF9519B3 CD3A431B 302B0A6D F25F1437
4FE1356D 6D51C245 E485B576 625E7EC6
F44C42E9 A637ED6B 0BFF5CB6 F406B7ED
EE386BFB 5A899FA5 AE9F2411 7C4B1FE6
49286651 ECE65381 FFFFFFFF FFFFFFFF, then Xa, in hexadecimal, might be

1497A673C719301D837645AA09836F30475D859F70
84967BF64829582A628475C63.

Party A then provides Ya to party B, preferably by transmitting Ya to party B, or by placing Ya in the public domain where party B can gain access to Ya in an authenticated manner. At this point, even though Ya, g, and p may all be publicly known, Xa is still secret because calculating Xa from the equation $$Ya = g^{Xa} \bmod p$$

is very difficult. Furthermore, at this step, presumably party B has performed steps identical to steps 302B, 306B, 310B, 314B of party A, so that the public value Yb of party B has been made available to party A. At step 318B, party A then receives Yb. At step 322B, party A, having its own private value Xa, and public value Yb from party B, then calculates Kab, where $$Kab = Yb^{Xa} \bmod p$$

Since $Yb = g^{Xb}$, $$Kab = ((g^{Xb})^{Xa}) \bmod p = g^{XbXa} \bmod p \qquad (1)$$

Similarly, at party B's side, party B has calculated Kba, where $$Kba = Ya^{Xb} \bmod p, \text{ and}$$

since $Ya = g^{Xa}$ $$Kba = ((g^{Xa})^{Xb}) \bmod p = g^{XaXb} \bmod p \qquad (1)$$

From equations (1) and (2)

$$K = Kab = Kba$$

where K is the secret key that is only known and shared between party A and party B. It is emphasized here that no one else except either party A or B can calculate K since no one except A and B knows either private value Xa or private value Xb. Additionally, the fact that the prime p and generator g are public knowledge does not lessen the security of the exchange because private values Xa and Xb remain secret and only known to A and B, respectively. At step 328B, party A then uses K, which is the same as Kab and Kba, to encrypt the original messages, and sends the encrypted message to party B at step 332B.

FIG. 3C illustrates how party B receives the encrypted message from party A. At step 302C, party B acquires public value Ya that has been provided by party A at step 314B in FIG. 3B. With the acquired public value Ya and its own private value Xb, party B calculates Kab at step 306C, where $$Kba = Ya^{Xb} \bmod p$$

At step 310C, party B at step 314C receives the encrypted message from party A, and party B uses Kab to decrypt the encrypted message received from party A.

In accordance with the present invention, a party uses the Diffie-Hellman exchange technique for communication with other parties, but the private value X is escrowed to an escrow center, and the generation of the public value Y in each one of the communication sessions is controlled after the private value X is escrowed. This scheme allows each secret key K involved in each communication session to be regenerated with the escrowed private value and the controlled public value serving as regenerating inputs. The intended party, the United States Government, for example, which is sanctioned by law to recover secret communications, can use the regenerated keys K to gain access to the desired secret communication sessions.

Since the private value X must remain secret, the escrowing of private value X to the escrow center must be done securely without intermeddling by any unintended party. Escrowing must also be done in an authenticated and confidential manner. This is accomplished by public key technology employed by both the escrow center and the escrowing party A. In one embodiment, party A must have an authenticated public key used for digital signature verification, and the escrowing center must have an authenticated public key from an algorithm which supports public key encryption e.g. RSA or El-Gamal.

Figure 4A:
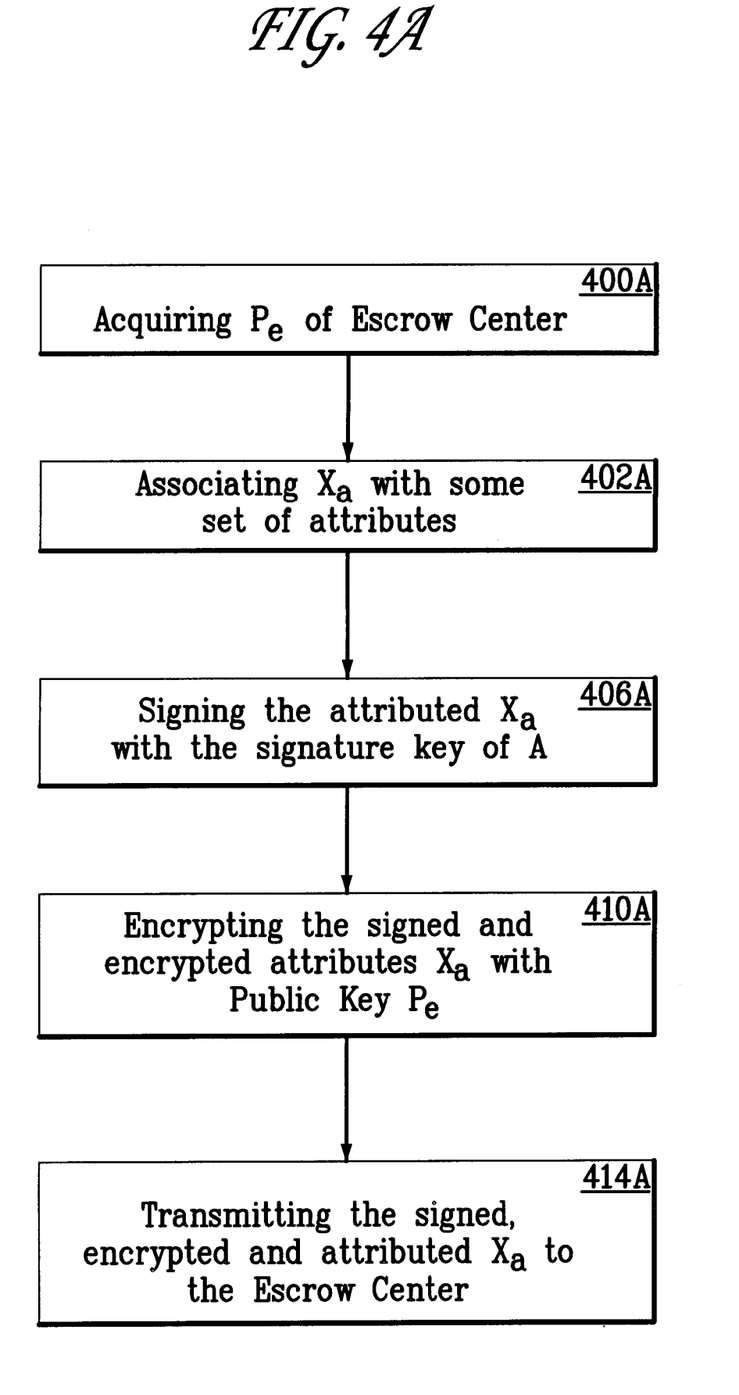
FIG. 4A shows the steps where a party A escrows private value Xa to an escrow center.

FIG. 4A shows a flow diagram of party A escrowing private value Xa to the escrow center. At step 400A, party A acquires public key Pe in an authenticated manner. At step 402A, party A associates Xa with a set of unique attributes, such as party A's name, address and date of birth, etc., for identifications purposes. At step 406A, party A signs the attributed Xa, preferably using digital signing, which involves a public and private key. The private key is secret while the public key is widely advertised. To sign a document, the document is hashed to produce a standard-sized target, which is then transformed using the private key. The document can only produce that target hash. Any change, even as minor as adding a single space or turning a period to a comma, will drastically change the target hash. To verify the signature, an inverse transformation is applied to prove that the signature could only be the result of the original transformation applied to the hash. For example, with signatures using RSA the sign is an encrypt transformation while the verify is a decrypt transformation. At step 410A, party A encrypts the signed Xa using Pe and, at step 414A, party A transmits the signed and encrypted Xa to the escrow center.

Figure 4B:
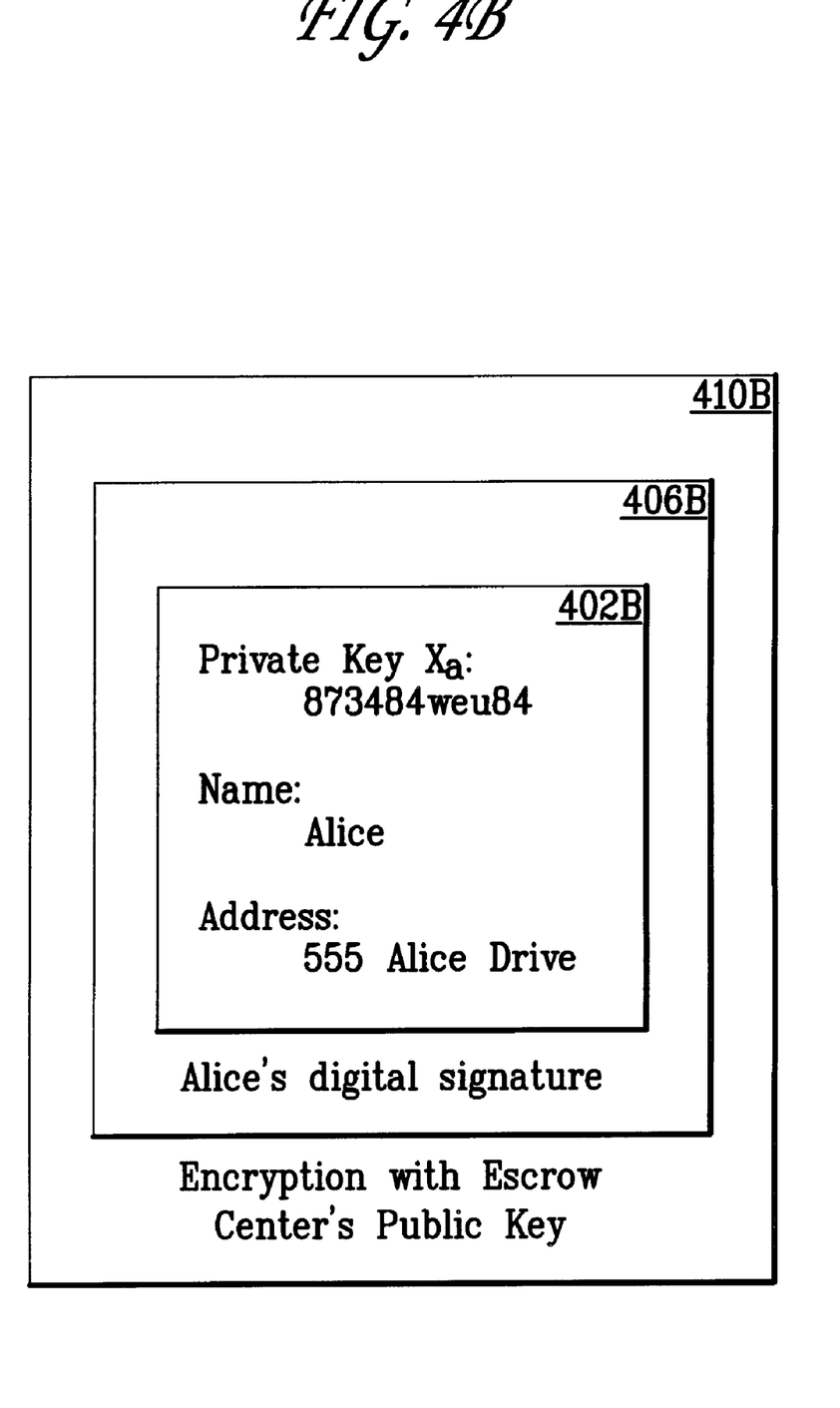
FIG. 4B illustrates a signed and encrypted private value Xa.

FIG. 4B illustrates a signed and encrypted Xa, where 402B represents private value Xa with the attributes of party A, 406B represents Xa with attributes that have been digitally signed, and 410B represents the attributed, signed and encrypted Xa.

Figure 4C:
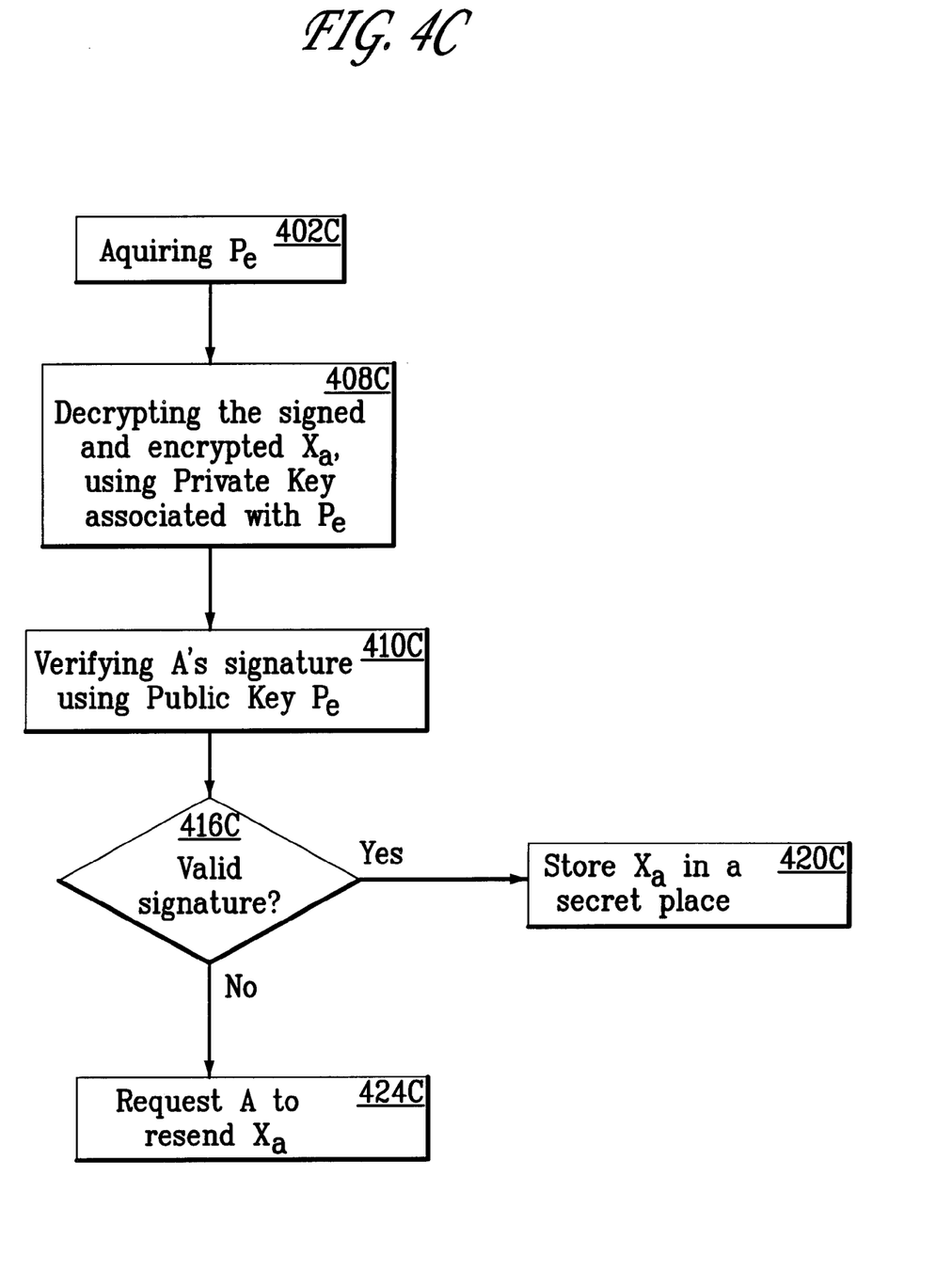
FIG. 4C shows how an escrow center receives the encrypted and signed private value Xa.

FIG. 4C shows a flow chart of the escrow center receiving the encrypted and signed Xa. At step 404C, the escrow center uses the private key associated with Pe and at step 408C, the escrow center decrypts the signed and encrypted message received from party A. At step 412C, the escrow center verifies the signature of party A using the authenticated public key of party A used for signature verification. At step 416C, the escrow center determines whether the signature is valid. If the signature is valid, then the escrow center at step 420C stores Xa in a secret place, and if the signature is not valid then the escrow center at step 424C requests party A to resend Xa.

Having escrowed the private value Xa in the escrow center, party A generates the public value Ya for each one of the subsequent communication sessions to other parties using the equation:

$$Ya = g^{(Xa+n)} \bmod p$$

where n differs for each of the sessions. Preferably, n equals 0 for the first communication session after private value Xa is escrowed, and n is incremented by one for each successive session. For example, party A's successive public values Ya0, Ya1, Ya2, ... Yan for sessions 0, 1, 2, ... n, after private value Xa is escrowed, are as follows:

$$Ya0 = g^{(Xa+0)} = g^{Xa} \bmod p$$

$$Ya1 = g^{(Xa+1)} \bmod p$$

$$Yan = g^{(Xa+n)} \bmod p$$

Figure 5:
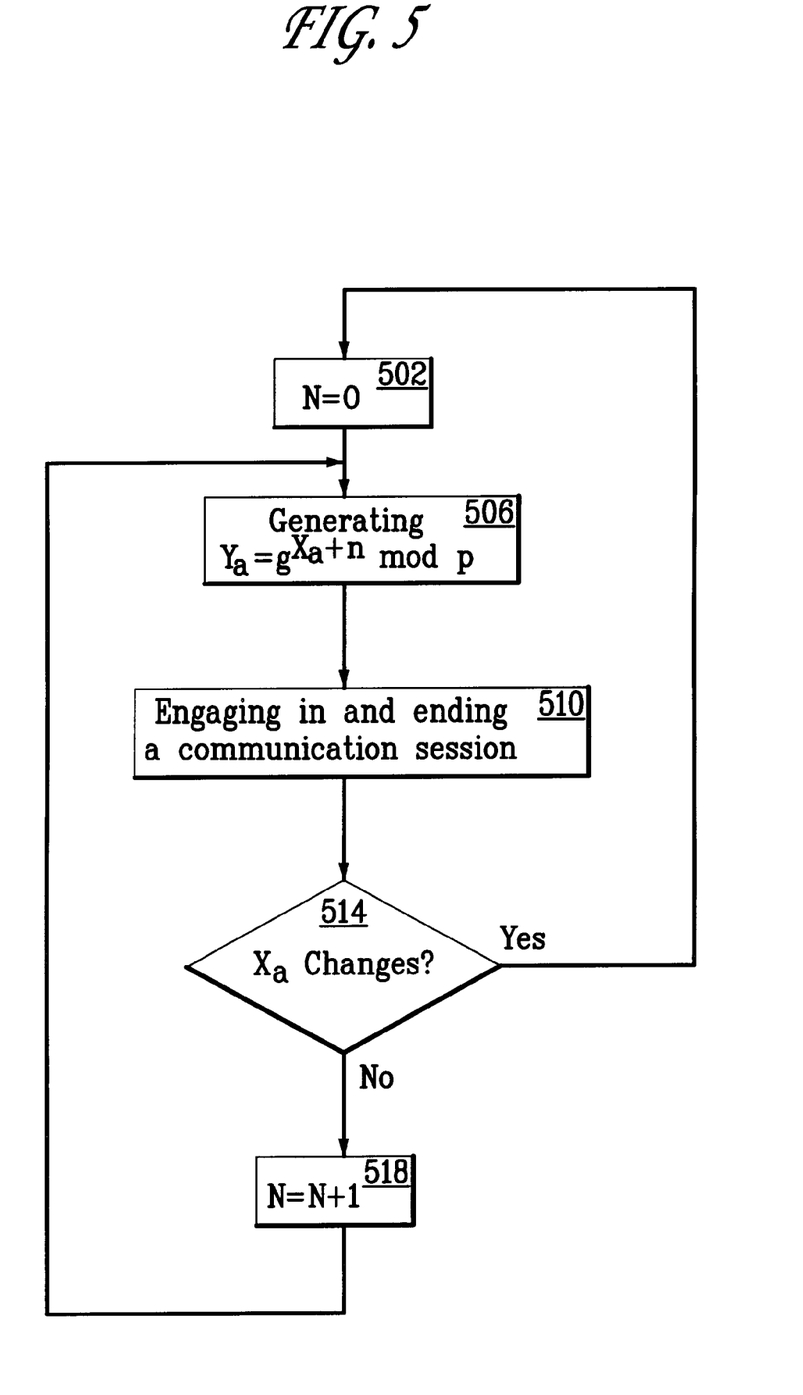
FIG. 5 illustrates how a party A generates public values Ya for each communication session after Xa has been escrowed.

FIG. 5 shows a flow chart in accordance with the present invention, where party A generates public values for each communication session after private value Xa is escrowed to the escrow center. At step 502, party A initializes n, preferably, to zero. At step 506, party A generates $Ya = g^{Xa+n} \bmod p$. At step 510, party A engages in communication exchange and subsequently ends the communication. At step 514, party A determines whether a new private value Xa needs to be escrowed. If a new escrow of Xa is not required, party A at step 518 increments n, preferably by 1, i.e. n=n+1. Party A then returns to step 506 for each one of the successive communication sessions. If Xa is required to be changed, party A at step 502 and at step 506 starts a new set of communication sessions.

Figure 6A:
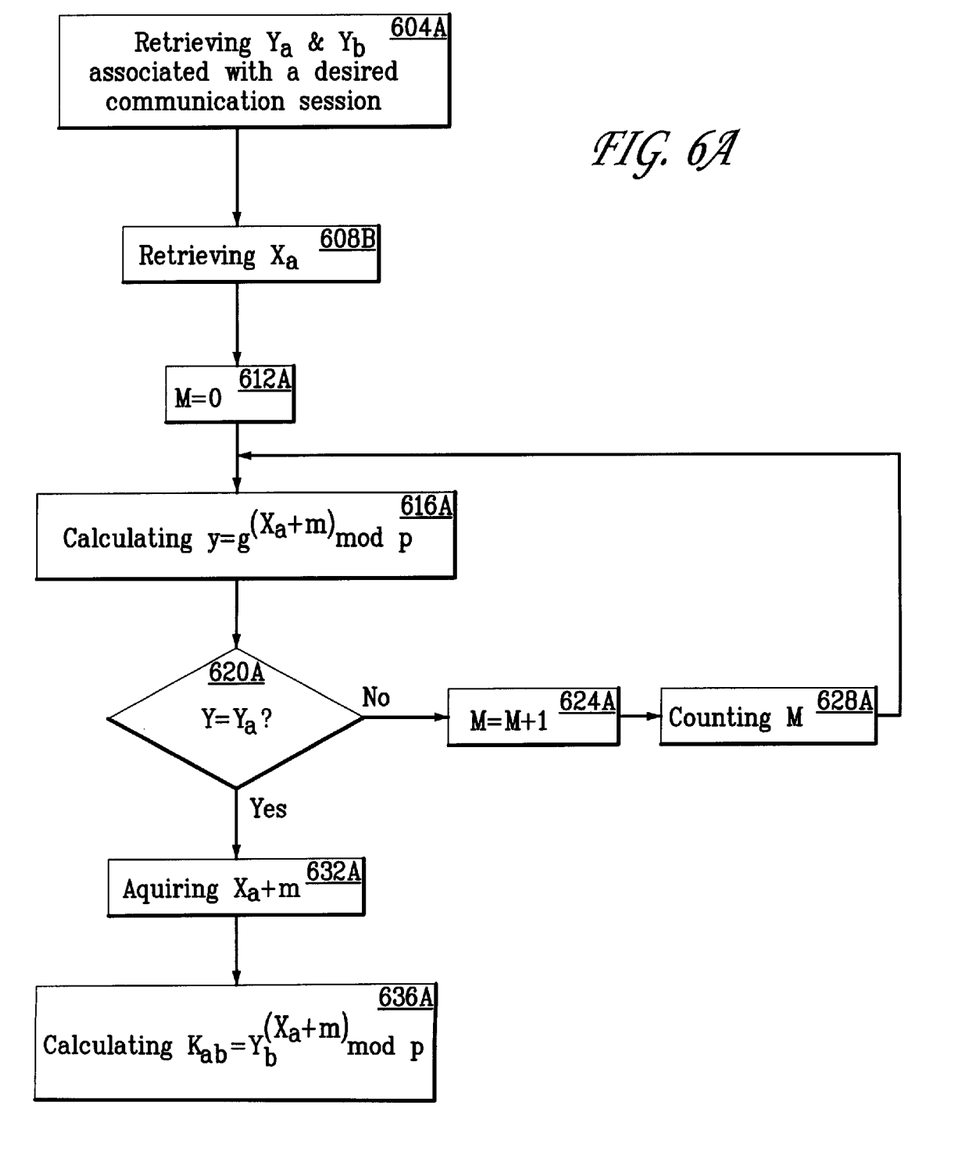
FIG. 6A illustrates a first preferred method showing how a law enforcement officer regenerates a secret key.
Figure 6B:
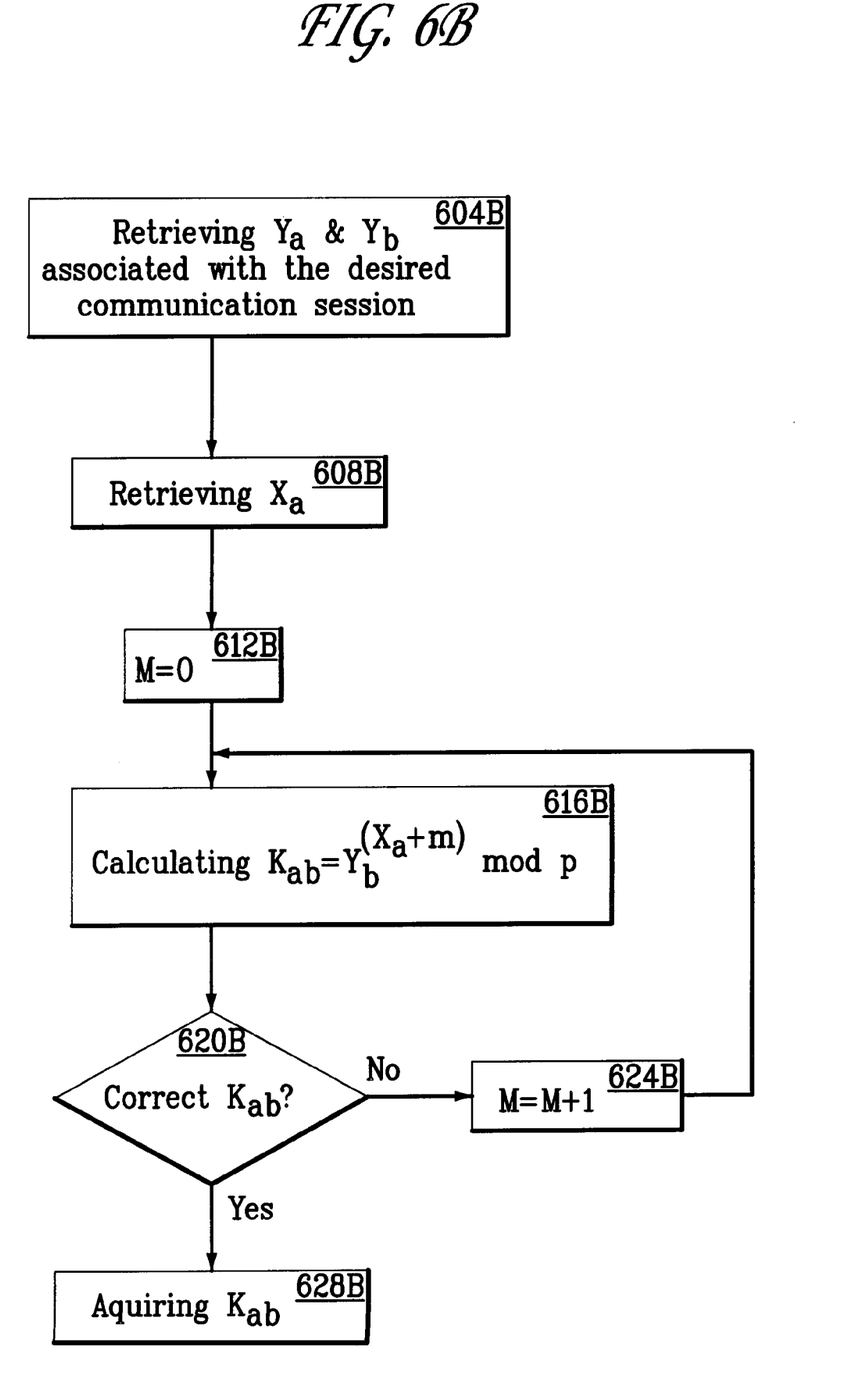
FIG. 6B illustrates a second preferred method showing how a law enforcement officer regenerates a secret key.

FIGS. 6A and 6B show two preferred methods where a party L, generally a law enforcement officer, regenerates secret keys Kab involved in a communication between escrowing party A and another party B. FIG. 6A illustrates a first preferred method of regenerating secret key Kab. At step 604A, law enforcement officer (LEO) retrieves public values Ya and Yb associated with a communication session that LEO desires to observe. LEO at step 608A also retrieves private value Xa from the escrow center. At step 612A, LEO preferably sets m to zero, and at step 616A, LEO calculates Y with the equation:

$$Y = g^{(Xa+m)} \bmod p$$

At step 620A, LEO compares Y and Ya. If Y does not equal Ya, then LEO has not yet successfully acquired the public value Ya for the desired communication, and at step 624A, LEO then changes m, preferably by incrementing m by one and then recalculates Y at step 616A until Y equals Ya at step 620A. LEO performs this incrementation, recalculation, and comparison m times by counting the successive iterations at step 628A. When Y equals Ya, LEO has acquired the correct private value Xa+m for the desired communication session. LEO then calculates secret key Kab at step 636A, where $$Kab = Yb^{(Xa+m)} \bmod p$$

FIG. 6B illustrates a second preferred method whereby LEO regenerates a secret key Kab. Steps 604B, 608B, and 612B are respectively identical to steps 604A, 608A, and 612A in FIG. 6A, where LEO retrieves Ya, Yb, and Xa, and intializes m. At step 616B, LEO calculates secret key Kab, where $$Kab = Yb^{(Xa+m)} \bmod p.$$

At step 620B, LEO determines whether the correct secret key Kab has been found by attempting to decrypt the messages involved in the communication session. If LEO cannot decrypt the messages, he has not acquired the correct secret key Kab. LEO then selects a different value for m, preferably by incrementing m by one (step 624B). LEO then recalculates Kab in step 616B until he has successfully acquired Kab at step 628B.

Having acquired secret key Kab by either of the two methods described in FIGS. 6A and 6B, LEO then may decrypt and inspect the encrypted messages involved in the desired communication session.

The invention has been explained above with reference to one or more preferred embodiments. Other embodiments will be apparent to those skilled in the art after reading this disclosure. For example, the present invention may be readily implemented in system configurations other than those utilizing routers as described in the preferred embodiment above. Any communications employing the Diffie-Hellman exchange can utilize the present invention. Additionally, the present invention may effectively be used in combination with networking systems other than that described above in accordance with the preferred embodiment. Therefore, these and other variations upon the preferred embodiments are intended to be covered by the present invention, which is limited only by the following claims.

What is claimed is:

1. A method for regenerating for a third party L a secret key Ks used in a Diffie-Hellman communication session S among a plurality of sessions communicated between a first party I and one or more second parties J, comprising the steps of:

(1) providing a private value Xi of said first party I to said third party L;

(2) using a number n, the number n differing for each of said communication sessions, and said private value Xi, in a first modular exponentiation equation $$Yi = g^{(Xi+n)} \bmod p,$$

wherein g represents a generator number and p represents a prime number, to generate a plurality of public values Yi of said first party I; each of said public values Yi being associated with one public value Yj of said party J for each of said communication sessions; and (3) determining for said third party L a number m associated with said number n to regenerate said secret key Ks in a second modular exponentiation equation, whereby said third party is able to decipher each of said communication sessions.

2. The method of claim 1, wherein said step of escrowing comprises the steps of:

(a) selecting a party M to which to provide said private value Xi;

(b) adding identifications to said private value Xi to produce a certificate Xis; and (c) transmitting said certificate Xis to said party M, using an encryption and signature technique.

3. The method of claim 1, wherein said number n is set to zero in a first of said communication sessions and is incremented by one for each one of successive sessions.

4. The method of claim 1 wherein said step (3) comprises the steps of:

acquiring a public value Yis and a public value Yjs, both of which are associated with said session S;

(ii) selecting a value for said number m;

(iii) calculating a number Y from the equation $$Y = g^{(Xi+m)} \bmod p$$

(iv) comparing said number Y to said public value Yis;

(v) if said number Y is not equal to said public value Yis, then selecting a different value for said number m and returning to said step (iii), else if said number Y is equal to said public value Yis, then continuing; and (vi) calculating said secret key K from the equation $$Ks = Yjs^{(Xi+m)} \bmod p.$$

5. The method of claim 4, wherein said number m is set to zero in said step (ii) and is incremented by one in said step (v).

6. The method of claim 1, wherein said step (3) comprises the steps of:

(i) acquiring a public value Yjs associated with said session S;

(ii) selecting a value for said number m;

(iii) calculating said secret key Ks, using the equation $$Ks = Yjs^{(Xi+m)} \bmod p;$$

and (iv) if said secret key Ks is not acceptable, then selecting a different value for said number m and returning to said step (iii), else if said secret key Ks is acceptable, then acquiring said secret key Ks.

7. The method of claim 6, wherein said number m is set to zero in said step (ii) and is incremented by one in said step (iv).

8. An apparatus for regenerating for a third party L a secret key Ks used in a Diffie-Hellman communication session S among a plurality of sessions communicated between a first party I and one or more second parties I, comprising:

means for providing a private value Xi of said first party I to said third party L;

means for using a number n, the number n differing for each of said communication sessions, and said private value Xi, in a first modular exponentiation equation $$Yi = g^{(Xi+n)} \bmod p,$$

wherein g represents a generator number and p represents a prime number, to generate a plurality of public values Yi of said first party I; each of said public values Yi being associated with one public value Yj of said party J for each of said communication sessions; and means for determining for said third party L a number m associated with said number n to regenerate said secret key Ks in a second modular exponentiation equation, whereby said third party is able to decipher each of said communication sessions.

9. The apparatus of claim 8, wherein said means for escrowing comprises:

(a) means for selecting a party M to which to provide said private value Xi;

(b) means for adding identifications to said private value Xi to produce a certificate Xis; and (c) means for transmitting said certificate Xis to said party M, using an encryption and signature technique.

10. The apparatus of claim 8, wherein n is set to zero in a first of said communication sessions and is incremented by one for each one of successive sessions.

11. The apparatus of claim 8, wherein said means for determining comprises:

means for calculating a value of said number m from the equation $$Y = g^{(Xi+m)} \bmod p$$

in which Y is a number; and means for calculating said secret key Ks from the equation $$Ks = Yj^{(Xi+m)} \bmod p.$$

12. The apparatus of claim 11, wherein said number m is set to zero for a first calculation of said number Y and is incremented by one in a successive calculation.

13. A computer-readable medium embodying instructions for causing a device to generate a secret key Ks used in a Diffie-Hellman communication session S among a plurality of sessions communicated between a first party I and one or more second parties J, by the steps of:

(1) providing a private value Xi of said first party I to a third party L;

(2) using a number n, the number n differing for each of said communication sessions, and said private value Xi, in a first modular exponentiation equation $$Yi = g^{(Xi+n)} \bmod p,$$

wherein g represents a generator number and p represents a prime number, to generate a plurality of public values Yi of said first party I; each of said public values Yi being associated with one public value Yj of said party J for each of said communication sessions; and (3) determining for said third party L a number m associated with said number n to regenerate said secret key Ks in a second modular exponentiation equation, whereby said third party L is able to decipher each of said communication sessions.

14. The computer-readable medium of claim 13, wherein said step of escrowing comprises the steps of:

(a) selecting a party M to which to provide said private value Xi;

(b) adding identifications to said private value Xi to produce a certificate Xis; and (c) transmitting said certificate Xis to said party M using an encryption and signature technique.

15. The computer-readable medium of claim 13 wherein said number n is set to zero in a first of said communication sessions and is incremented by one for each one of successive sessions.

16. The computer-readable medium of claim 13, wherein said step (3) comprises the steps of:

(i) acquiring a public value Yis and a public value Yjs, both of which being associated with said session S;

(ii) selecting a value for said number m;

(iii) calculating a number Y from an equation $$Y = g^{(Xi+m)} \bmod p;$$

(iv) comparing said number Y to said public value Yis;

(v) selecting a different value for said number m if said number Y is not equal to said public value Yis and returning to said step (ii), else if said number Y is equal to said public value Y is, then continuing; and (vi) calculating said secret key Ks from the equation $$Ks = Yj^{(Xi+m)} \bmod p.$$

17. The computer-readable medium of claim 16, wherein said number m is set to zero in said step (ii) and is incremented by one in said step (v).

18. The computer-readable medium of claim 13, wherein said step (3) comprises the steps of:
(i) acquiring a public value Yjs associated with said session S;
(ii) selecting a value for said number m;
(iii) calculating said secret key Ks from the equation $$Ks = Yj^{(Xi+m)} \mod p;$$

and (iv) if said secret Ks is not acceptable, then selecting a different value for said number m and returning to said step (ii), else if said secret key Ks is acceptable, then acquiring said secret key Ks.

19. The computer-readable medium of claim 18, wherein said number m is set to zero in said step (ii) and is incremented by one in said step (iv).

20. The method of claim 1 further comprising the step of escrowing said private value Xi to a fourth party.

21. The method of claim 1 wherein said step (3) comprises the steps of:
(i) acquiring a public value Yis and a public value Yjs, both of which are associated with said session S;
(ii) using said public value Yis and said public value Yjs to determine said number n; and
(iii) calculating said secret key Ks from the equation $$Ks = Yjs^{(Xi+n)} \mod p.$$

22. The method of claim 21 further comprising the step of acquiring said private value Xi from an escrow center.

23. The apparatus of claim 8 further comprising means for escrowing said private value Xi to a fourth party.

24. The apparatus of claim 8 wherein said means for determining comprises:
means for acquiring a public value Yis and a public value Yjs, both of which are associated with said session S;
means for using said public value Yis and said public value Yjs to determine said number n; and
means for calculating said secret key Ks from the equation $$Ks = Yjs^{(Xi+n)} \mod p.$$

25. The apparatus of claim 24 further comprising means for acquiring said private value Xi from an escrow center.

26. The computer-readable medium of claim 13 further comprising the step of escrowing said private value Xi to a fourth party.

27. The computer-readable medium of claim 13 wherein said step (3) comprises the steps of:
(i) acquiring a public value Yis and a public value Yjs, both of which are associated with said session S;
(ii) using said public value Yis and said public value Yjs to determine said number n; and
(iii) calculating said secret key Ks from the equation $$Ks = Yjs^{(Xi+n)} \mod p.$$

28. The computer-readable medium of claim 27 further comprising the step of acquiring said private value Xi from an escrow center.

29. A method for regenerating for a third party L a secret key Ks used in a Diffie-Hellman communication session S among a plurality of sessions communicated between a first party I and one or more second parties J, comprising the step of:

using a number n at node A, the number n differing for each of said communication sessions, and a private value Xi of said first party I, in a first modular exponentiation equation $$Yi = g^{(Xi+n)} \mod p,$$

wherein g represents a generator number and p represents a prime number, to generate a plurality of public values Yi of said first party I; each of said public values Yi being associated with one public value Yj of said party J for each of said communication sessions;

whereby a number m associated with said number n is determinable for a third party L to regenerate said secret key Ks in a second modular exponentiation equation and decipher each of said communication sessions.

30. An apparatus for regenerating for a third party L a secret key Ks used in a Diffie-Hellman communication session S among a plurality of sessions communicated between a first party I and one or more second parties J, comprising:

means for using a number n, the number n differing for each of said communication sessions, and a private value Xi of said first party I, in a first modular exponentiation equation $$Yi = g^{(Xi+n)} \mod p,$$

wherein g represents a generator number and p represents a prime number, to generate a plurality of public values Yi of said first party I; each of said public values Yi being associated with one public value Yj of said party J for each of said communication sessions;

whereby a number m associated with said number n is determinable for a third party L to regenerate said secret key Ks in a second modular exponentiation equation and decipher each of said communication sessions.

31. A computer-readable medium embodying instructions for causing a device to generate a secret key Ks used in a Diffie-Hellman communication session S among a plurality of sessions communicated between a first party I and one or more second parties J, by the steps of:

using a number n, the number n differing for each of said communication sessions, and a private value Xi of said first party I, in a first modular exponentiation equation $$Yi = g^{(Xi+n)} \mod p,$$

wherein g represents a generator number and p represents a prime number, to generate a plurality of public values Yi of said first party I; each of said public values Yi being associated with one public value Yj of said party J for each of said communication sessions;

whereby a number m associated with said number n is determinable for a third party L to regenerate said secret key Ks in a second modular exponentiation equation and decipher each of said communication sessions.

* * * * *